Patented Oct. 24, 1939

2,176,946

UNITED STATES PATENT OFFICE 2,176,946

HARD EXPANDED RUBBER

Dudley Roberts, New York, N. Y., and Lester S. Cooper, Bedford, Va., assignors to Rubatex Products, Inc., New York, N. Y., a corporation of Delaware No Drawing. Application January 2, 1936, Serial No. 57,248

3 Claims. (Cl. 18—53)

This invention relates to dense expanded rubber having a hard polishable surface.

Hard rubber is used to make many articles where a hard polishable surface is desired. Ordinary hard rubber has a density of about ninety to one hundred pounds a cubic foot. Such rubber does not expand so that it is relatively difficult to manufacture articles having surface and contour irregularities. Gas expanded rubber lends itself to ready expansion to fill complicated molds. However, such material has heretofore been relatively light in weight being of the order of six to eight pounds per cubic foot, but had no hard polishable surface. It has been proposed to add a layer of ungassed rubber onto thoroughly gassed stock before placing it in the mold for final curing in order to secure a hard polishable surface. However, such a method is cumbersome and expensive and results in a high percentage of rejections in manufacture.

We have discovered that the addition of rubber dust to the composition of the gas expanded rubber results in a product having a surface which may be highly polished. The density of the resultant expanded rubber is twenty to forty pounds per cubic foot depending chiefly upon the percentage of rubber dust used. The gas expanded rubber is produced in a manner similar to that described in the pending application of Scott, Robert and Peel, Ser. No. 717,550 filed March 27, 1934 except for the addition of the rubber dust. The dense expanded rubber may be used for readily molding articles having complicated shapes since during the final curing stage appreciable volume expansion takes place to completely fill irregular molds. The ordinary type of hard rubber does not expand in this manner but must be entirely shaped before being placed in the mold for final curing.

The hard expanded rubber produced according to the present invention may be used for practically any application that the well known hard rubber is used for; for example, sheet stock, toilet seats, ice cream can covers, electrical insulation and all other articles requiring great tensile and compressive strength. The dense expanded rubber comprises less than half the raw materials as compared to ordinary hard rubber and may accordingly be manufactured at a considerably lower cost than hard rubber.

Accordingly, an object of this invention is to provide a novel, dense, expanded gassed rubber.

Another object of this invention is to provide a novel, gassed, expanded rubber having a polishable surface so that a high gloss may be produced thereon.

A further object of this invention is to provide a novel hard rubber which is expandible within the mold so that hard rubber articles having irregularities of surface and contour may be readily manufactured.

A further object of this invention is to provide a novel hard rubber of approximately half the density of ordinary hard rubber at a considerably lower cost.

Still another object of this invention is to provide a novel expanded hard rubber of relatively high tensile and compressive strenth.

These and other objects of our invention will become apparent in the following description of a preferred composition illustrating our invention.

The ingredients entering into the composition are as follows, expressed in relative parts by weight:

|  | Parts by weight |
|---|---|
| Smoked rubber sheet | 100.000 |
| Sulphur | 50.000 |
| Whiting | 30.000 |
| Light calcined magnesia | 16.000 |
| Reogen | 1.250 |
| Zinc oxide | 7.000 |
| Petrolatum | 4.850 |
| Carbon black | 2.000 |
| Paraffin wax | 3.000 |
| Agerite powder | 1.250 |
| Diphenyl guanidine | .625 |
| Mercaptobenzothiazole | .200 |
| Hard rubber dust | 50.000 |
|  | 266.175 |

The ingredients are prepared and the rubber product is manufactured in a manner similar to that described in the application Serial No. 717,550 supra. The addition of the hard rubber dust or ebonite dust as it is generally known is the basis of the present invention and the manufacture of the gas expanded rubber composition may be carried out in any suitable manner already established in the art.

The sheets of rubber are masticated and the ingredients are mixed on the mill until they are completely dispersed to produce a rubber dough. The dough is then calendered or tubed dependent upon the shape of the article to be made. After eighteen hours or less, the dough is placed in an autoclave. As is well known in the art, the autoclave is a high pressure gassing vessel containing an internal piping structure for steam heating or water cooling of its contents. After the air has been removed, inert gas at a pressure of about 2800 pounds at room temperature is applied within the chamber and one pound per square inch pressure of steam is admitted in the heating coils for one and a half hours. The apparatus is then permitted to cool down for one hour (no water on) and then cooled for two and a half hours with circulating water flowing through the autoclave pipe structure. The gas pressure is then withdrawn from the autoclave and the gassed dough is removed. The gas at a high pressure is adsorbed by the rubber dough and the heat in the autoclave semi-cures the dough so that upon its removal from the autoclave, the gas is retained in the dough in individual cells.

The gassed rubber dough is then roughly shaped before being placed into the molds. The mold may have irregular shapes or contours since the rubber dough will expand to fill them during the final curing process. The rubber dough is placed in the mold which is placed into a platen press. The press maintains sufficient pressure on the mold to counteract the expansive forces generated by the expanding rubber within it so that it may conform to the desired molding or shape. The platens are steam heated so that the dough within the mold may be finally cured. Forty pounds per square inch of steam is applied for one-half hour followed by the application of ninety pounds per square inch steam pressure for one and a half hours. The platen press is then cooled down as quickly as possible to complete the cure. The product is removed from the mold only when the mold is thoroughly cooled. The rubber dough is compounded so that when it is placed in the autoclave under high pressure of an inert gas, it will be partially cured sufficiently to retain a large amount of the adsorbed or occluded gas after the gas pressure is released and yet be sufficiently uncured to possess expandibility and mobility for properly filling the mold during the final curing stage. The process is based upon the formation of a myriad of independent gas cells within the dough by the inert gas at high pressure. Each minute cell expands in size according to the contained pressure of the gas and according to the tensile strength and percentage elongation of the dough. During the heating of the final curing stage, the entrapped gas of the individual cells exerts great internal pressure, further expanding the cells. At least twenty-five per cent increase in volume occurs during the final curing stage and the quantity of dough placed in the mold should permit proper expansion thereof. Overexpansion should be avoided to prevent rupturing of the gas cells during the final expansion so as to produce a product having an individual gas cellular structure.

The hard rubber dust is completely dispersed in this stock and is vulcanized during the final curing stage. The resultant finally cured product lends itself readily to grinding down and polishing operations necessary to produce a high gloss on its surface. This product may be produced having a skin thickness of $\frac{1}{32}$ of an inch or more. The thickness of the skin depends upon the density of the stock, a denser stock producing a thicker skin. By the term skin is meant that outer portion of the product where the gas cells have been ruptured to produce a non-porous, non-cellular layer or skin on the product. There is hydrogen sulphide gas generated during the curing process, adding substantial increase to the internal pressure of the stock to aid in further expansion thereof.

The polishing is preferably accomplished by first grinding and then buffing as is well known to those skilled in the mechanical arts. Three grinding operations, with abrasives, coarse, medium and fine, are performed successively; the final polishing operation is performed with a buffing wheel to produce a high gloss on the surface of the product.

The hard rubber dust added to the gas expanded rubber and vulcanized therewith, acts as a filler having the same abrasive co-efficient as the remaining stock excepting the mineral fillers. When a given area is to be polished, it is necessary for the surface to wear down evenly or smoothly under the action of the abrasive. Hard rubber dust is used because the resultant product will have a homogeneous abrasive co-efficient so that a homogeneous finish may be produced thereon. If coarse mineral fillers are used to any great extent, the abrasive will tear out the pocketed mineral filler during the polishing process to produce pitted marks. Accordingly, the use of coarse mineral fillers should be avoided but the specified mineral ingredients should be finely ground so that a high gloss may be produced upon the surface of the product. The rubber product of the present invention may be made having a density of twenty to forty pounds per cubic foot to produce a hard, dense, expanded rubber having relatively high tensile and compressive strength. Since ordinary hard rubber products weigh from ninety to one hundred pounds per cubic foot, the product of this invention may be produced at a substantially lower cost per cubic foot. The hard expanded rubber according to this invention, may be substituted for ordinary hard expanded rubber in practically all applications. It possesses the necessary strength, it may be readily highly polished and may be fabricated into complicated shapes as a result of its marked expandibility within the mold. Some of the articles of manufacture which may be made with the dense, expanded rubber composition are, for example, sheet stock, toilet seats, ice cream container lids, polished panels, refrigerator doors, electrical heat and sound insulation members and the like.

Although we have described in detail the specific constituents of the preferred form of our product and the exact steps of one process for forming the same, it will be obvious that modifications thereof still coming within the scope and spirit of the invention may be made both in the constituent parts and in the process and we do not intend to be limited except as set forth in the following claims.

We claim:

1. As an article of manufacture, a hard and rigid gas expanded rubber structure containing a multiplicity of small sealed cells of gas, said structure containing a substantial amount of hard rubber dust, said hard and rigid gas expanded rubber structure having a density on the order of 20 to 40 lbs. per cu. ft.

2. As an article of manufacture, a hard and rigid gas expanded closed cell rubber structure with a substantial amount of hard rubber dust at the periphery of the structure adapted to provide a highly polished surface, said hard and rigid gas expanded closed cell rubber structure having a density on the order of 20 to 40 lbs. per cu. ft.

3. As an article of manufacture, a hard and rigid gas expanded closed cell rubber structure with a substantial amount of hard rubber dust contained in the periphery of the structure, said hard rubber dust being adapted to produce, upon polishing, a homogeneous and bright rubber surface, said hard rubber dust being distributed substantially homogeneously throughout the rubber structure and materially increasing the tensile and compressive strength thereof.

DUDLEY ROBERTS.
LESTER S. COOPER.